April 29, 1952
R. P. J. BERTEAUX
2,594,723
PROCESS FOR PRODUCING GRANULAR
CLUSTERS OF CRYSTALLINE MATTER
Filed July 17, 1947
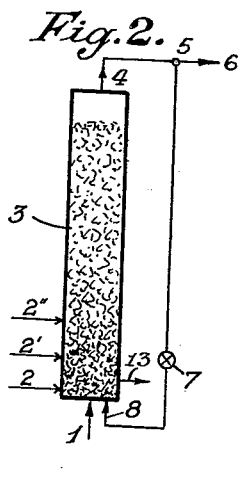
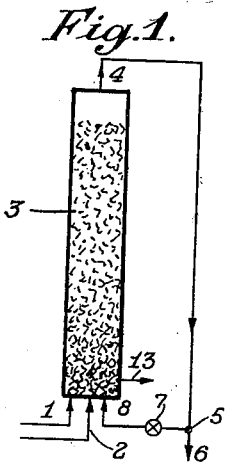
INVENTOR
RAOUL P. J. BERTEAUX
BY
Robert E. Burns
ATTORNEY Patented Apr. 29, 1952

2,594,723

UNITED STATES PATENT OFFICE 2,594,723

PROCESS FOR PRODUCING GRANULAR CLUSTERS OF CRYSTALLINE MATTER

Raoul P. J. Berteaux, Uccle-Brussels, Belgium, assignor to Solvay & Cie, Brussels, Belgium, a company of Belgium Application July 17, 1947, Serial No. 761,594
In Belgium July 31, 1943

Section 1, Public Law 690, August 8, 1946
Patent expires July 31, 1963

4 Claims. (Cl. 23—295)

It is known that crystallization by seeding, the object of which is to deposit the precipitating material on seed crystals without formation of new crystalline germs, is frequently carried out in continuous apparatus by introducing a supersaturated solution into the bottom of a reservoir containing a suspension of seed crystals.

According to the supply of solution introduced, the crystals obtained are either of regular (geometrical) shape or they may form roughly spherical clusters of tiny crystals.

The seeding process is widely applied in the manufacture of crystals of very soluble salts. Its principle consists in the use of supersaturated solutions in metastable condition, i. e., of such concentration that no precipitation occurs when no seeding crystals are present. At higher supersaturation the spontaneous precipitation of tiny crystals could not be avoided, such precipitate would hamper the desired crystal growth, and instead heaps of "crystal mud" would be obtained.

Some methods of getting the proper supersaturation consist in evaporating or cooling a saturated solution; it is also known to produce such supersaturation by bringing together proper amounts of reagents which give rise to the formation of salts in quantities as to get the proper supersaturation of the solution.

Such known processes are not applicable to solutions of valuable soluble salts containing undesired impurities which are to be removed by the seeding operation, and I am not aware of any process by which the use of settling tanks can be avoided without any loss or destruction of the salts to be purified.

It is the object of this invention to make possible the application of the continuous crystallization principle to the removal of undesired compounds, by chemical reaction, in a body of solutions of desired or valuable soluble compounds. More particularly it is the object of this invention to accelerate the removal of precipitates to a considerable extent and to avoid the use of cumbersome settling tanks. With this method according to the present invention the geometric crystal shape is systematically avoided and the wording "growth of crystals" used in this specification applies to continuous sedimentation of tiny crystals, or newly produced germs, on the nuclei suspended in an ascending stream of mother liquor.

The process according to the invention, consists in introducing the reacting solutions, i. e., the one which contains the ion to be precipitated and the other which contains the precipitating agent, into the bottom of a vertical reaction column where the crystals to be grown are suspended in the ascending flow of the solutions in order that the chemical reaction takes place amidst said suspension of growing crystals; according to a feature of the invention, part of the clear liquid resulting from the separation of the precipitate is taken from the top of the column and introduced, at the same time as the reacting solutions, into the bottom of said column in order to control the supersaturation, the ratio of flow of said clear liquid to flow of reacting solutions being controlled in accordance with the desired size of crystal aggregates to be obtained.

According to my process, said supersaturation will be considerably higher than the metastable concentration, as defined before. It must be understood that the chemical reaction takes place in the crystallizer, the same vessel being used for both operations at the same time and the same place, and this feature makes a difference with the known appliances and processes.

Therefore the total supply of liquid in circulation will be determined to keep the crystals suspended in the ascending flow of said liquid, said supply depending of course on the dimensions of the apparatus and the size of the crystals to be obtained.

The flow can be regulated so as to maintain the crystals in a dense suspension to such an extent as to bring them into contact with one another, in order, if necessary, to build polycrystalline aggregates. The liquid flow and the concentration can be controlled in order to develop these aggregates. The supersaturation can be increased so as to produce new crystal germs. Finally, the relative proportions of reacting solutions and the clear diluent solution can be adjusted in such a manner as to control the crystallization precisely as desired.

It has been found possible, in purifying salt solutions, to control the formation of crystal aggregates of precipitated impurities and the growth thereof at a suprising rate of speed, and to obtain a settling rate of 300 meters per hour, although the same compounds, with the usual methods of precipitation, sink at the rate of only 0.1 meter per hour. Obviously the settling tank may be made considerably smaller, or even entirely dispensed with.

The process according to my invention may be applied to the simultaneous precipitation of two or more compounds. Chemically heterogeneous crystal aggregates are then obtained, consisting of crystal associations of separate salts, or double salts of two compounds simultaneously precipitated. By such simultaneous precipitation of two or more bodies, it is possible to build heterogeneous aggregates of compounds which, taken separately, can only aggregate very slowly on seeding nuclei or not at all. For example, it is even possible to fix magnesium hydroxide by means of calcium carbonate on carbonate clusters or nuclei.

It is known to be advantageous, in some cases, to introduce reagents at different levels of a reacting column. Such principle may be applied to my purifying process. For example, the output of my "reactor-crystallizer" may be increased by precipitating only a small portion of impurities, fixing them to the growing aggregates, again supersaturating the solution, separating fresh quantities of undesired impurities, and so on. By such method one could avoid the precipitation of germs of tiny crystals if the concentration of impurities were very high and would necessitate the introduction of large quantities of reagents at once.

In order that the features and advantages of the invention may be more readily understood, reference will be had to the diagrammatic drawings, in which Figs. 1 and 2 show diagrammatically two forms of apparatus for carrying out my improved process.

When carrying out a chemical reaction of the type $A+B=C+D$, where: A is the compound containing the ion to be precipitated, B the reagent, C the precipitated compound, and D the dissolved compound which is the residue of the reaction, the solutions of A and B are introduced by pipes 1 and 2 into the bottom of the column 3 which contains a suspension of crystals of compound C (or aggregates of such crystals). Liquid D passing out at 4 is divided at 5 into two portions, one of which is removed at 6, whilst the other, impelled by a pump 7 is also introduced into the bottom of column 3, either separately at 8, as shown on the drawing, or together with one or both liquids introduced through 1 and/or 2.

The process may be started without seed crystals. The addition of the solution D, from which precipitable ions have been removed, to the fresh solutions A and B, obviously reduces the concentration of precipitable ions in solution A. If the amount of matter precipitated per unit of time is very small, the first crystals formed in the column grow and develop into geometrical crystals. This, however, requires a very strong dilution of the medium in the reactor, and the amount of purified liquid, passing out at 6 is very small as compared with the capacity of the column. The crystals would be geometrically perfect but their formation would be extremely slow.

In practice it is far to be preferred, in order to increase the output of the apparatus manyfold, to promote the formation of nuclei of crystal aggregates, which will be called "polycrystals" herein for purposes of description.

For this purpose the total supply of liquid entering into the column is regulated to such an amount as to bring the first crystals formed very near to one another and keep them in dense suspension even so that they will touch. Whilst the reaction proceeds, clusters, i. e., polycrystalline aggregations are formed. During this time, a portion of the exhausted solution leaves the column as a clear liquid through pipe 6, whilst the other part is recycled to the bottom of the column through pipe 8.

The aggregates or nuclei so obtained may now be used as "seed crystals." This preparation may be dispensed with when seed crystals are available, in such case they are directly introduced into the column and suspended into the ascending liquid flow.

The ascending flow is now increased so as to keep the nuclei separated from one another according to the well known conditions of crystallization by seeding.

According to this condition the supply of ascending liquid should be proportioned to the size of the largest polycrystals at the bottom of the column, to the specific weight of said polycrystals, i. e., to the chemical nature of the precipitated body and to the viscosity of the mixture of the reacting solutions.

It likewise follows that for a given flow of ascending liquid, the polycrystals should be withdrawn in due course from the apparatus through exit 13 in order to avoid their settling and their contact between one another.

The operations described apply to the starting of the process, the normal working being continuous. In this way a clear liquid is obtained even from the beginning. The method allows, at any time, for modification of the manner of crystallization, or the shape and sizes of the solids obtained, by controlling the total supply at the inlet, the ratio of flows of liquids through pipes 1 and 7 and the introduction of the reagents through pipe 2, or if desired, at any intermediate spot such as 2' and 2" (Fig. 2) between the bottom of the column and the clear liquid. It is thus possible to cause simultaneously the increase of the dimensions of the polycrystals and the appearance of the new germs in order to assure continuous controlled seeding. It is also possible to activate the seeding, by known means, by reintroducing into the apparatus the fragments of polycrystals obtained by crushing the solid product withdrawn at the bottom of the crystallizer without departing from the scope of the invention.

*Example 1*

Precipitation of the $SO_4$ ion in the body of a liquid of manufacture.

The precipitation can be obtained by reaction with a solution of $BaCl_2$ or with a milk of $BaCO_3$. The manufactured liquid circulates along the path 1—3—4 then is divided at 5 following along the paths 6 and 7 (Fig. 1). The solution containing the Ba ion is introduced at 2. There is obtained, by operating according to the general method of operation described above, a suspension of polycrystals of $BaSO_4$, in the reaction apparatus. The polycrystals are continuously or periodically removed at the bottom of the apparatus. The liquid impoverished of $SO_4$ ions passes out in a clear state through the pipe 6.

Crystallisation can be conducted in such a manner that the hydrated crystals partly or entirely obtain their water of crystallisation from the solvent of the precipitable ions.

*Example 2*

Simultaneous precipitation of Ca and Mg ions in a manufactured liquid.

The initial solution introduced at 1 (Fig. 1) contains for example $CaCl_2$ and $MgCl_2$. It is mixed with clear liquid in circulation and added to Na₂CO₃ and NaOH introduced at 2. There is produced chemically heterogeneous crystals of CaCO₃ and of Mg(OH)₂. Precipitated separately, Mg(OH)₂ would be presented in a form such that the separation would necessitate substantial decanters or filters.

*Example 3*

The initial solution contains magnesium chloride, but not calcium chloride. By adding a calcium salt, there is produced as previously chemically heterogeneous polycrystals facilitating considerably the elimination of precipitated Mg(OH)₂.

I claim:

1. A process of removing undesired ions from a solution containing said ions in admixture with desired products, said undesired ions being removed in the form of substantially spherical aggregations of crystalline compounds precipitated by chemical reaction, which comprises continuously flowing said solution upwardly through a vertical reaction chamber, admitting to the bottom of said chamber a solution containing a precipitating agent for the undesired ions, said precipitating agent forming insoluble compounds with said ions but being unreactive with the desired products in said first-mentioned solution, whereby to form a precipitate of the insoluble reaction product of the precipitating agent and the undesired ion, keeping said precipitate in suspension in the ascending flow of liquid solely by controlling the velocity of said flow, thereby agglomerating said precipitate and forming crystal clusters, said clusters serving as nuclei on which further precipitated reaction product is fixed and the clusters are caused to grow to substantially spherical aggregations of sufficient size to fall by gravity against the flow of said solution to the bottom of said chamber, withdrawing solution free of precipitate but containing said desired substance in dissolved form from the top of said reaction chamber, introducing a portion of said precipitate-free solution into the bottom of said chamber to control the supersaturation of the solution flowing upwardly in said chamber, and withdrawing the spherical crystal aggregations from the bottom of said chamber.

2. In a process as claimed in claim 1, controlling both the recycled part of said precipitate-free solution and the total flow of ascending liquid so as to bring into contact with each other the nascent germs resulting from the chemical reaction and to form new nuclei of crystal aggregates.

3. In a process as claimed in claim 1, starting the process without suspended nuclei, controlling the supersaturation in and the total flow of ascending liquid through the chamber so as to form the required nuclei, then increasing said supersaturation so as to accelerate precipitation and increasing the said flow so as to avoid contact between the suspended nuclei.

4. A process of removing sulfate ions from a solution of calcium chloride containing said sulfate ions which comprises continuously flowing said solution upwardly through a vertical reaction chamber, admitting to the bottom of said chamber a solution containing a soluble barium salt which forms insoluble barium compounds with said sulfate ions, whereby to form a precipitate of barium sulfate, keeping said precipitate in suspension in the ascending flow of liquid solely by controlling the velocity of said flow, thereby agglomerating said precipitate of barium sulfate and forming crystal clusters, said clusters serving as nuclei on which further precipitated barium sulfate is fixed and the clusters are caused to grow to substantially spherical aggregations of sufficient size to fall by gravity against the flow of said solution to the bottom of said chamber, withdrawing solution free of precipitate but containing said calcium chloride in dissolved form from the top of said reaction chamber, introducing a portion of said precipitate-free solution into the bottom of said chamber to control the supersaturation of the solution flowing upwardly in said chamber, and withdrawing the spherical crystal aggregations from the bottom of said chamber.

RAOUL P. J. BERTEAUX.

REFERENCES CITED

The following references are of record in the file of this patent:

UNITED STATES PATENTS

| Number | Name | Date |
| --- | --- | --- |
| 1,845,742 | Cocksedge | Feb. 16, 1932 |
| 1,880,925 | Eissner | Oct. 4, 1932 |
| 2,037,595 | Schaefer | Apr. 14, 1936 |